Dec. 12, 1961 G. V. YOUNG 3,013,104

HEAT BANK FOR TRANSISTORIZED CIRCUITS

Filed July 18, 1957

3 Sheets-Sheet 1

GEORGE V. YOUNG
INVENTOR.

BY

ATTORNEYS

GEORGE V. YOUNG
INVENTOR.
BY Philip Sutker
Max Gelder
ATTORNEYS

Dec. 12, 1961 G. V. YOUNG 3,013,104

HEAT BANK FOR TRANSISTORIZED CIRCUITS

Filed July 18, 1957

3 Sheets-Sheet 3

GEORGE V. YOUNG
INVENTOR.

BY Philip Sutton
Max Geldin
ATTORNEYS

United States Patent Office 3,013,104
Patented Dec. 12, 1961

3,013,104

HEAT BANK FOR TRANSISTORIZED CIRCUITS

George V. Young, Los Angeles, Calif., assignor to Video Instruments Company, Inc., Los Angeles, Calif., a corporation of California Filed July 18, 1957, Ser. No. 672,812
5 Claims. (Cl. 174—52)

This invention relates to temperature stabilization of transistorized circuits, and is more particularly concerned with a novel device in the form of a heat bank in which the transistorized circuit is placed to minimize the effect of ambient temperature variations on the output of such circuit.

This application is a continuation-in-part of my copending application Serial No. 652,558, filed April 12, 1957, now abandoned.

It is a characteristic of transistors and transistor circuits, for example, transistor amplifiers, to be sensitive to thermal changes, the magnitude of this sensitivity depending on the type of transistor and whether it is of the germanium or silicon type. Thus such temperature changes affect the collector current and the saturation current of the transistors. The changes in bias which may be affected by such temperature changes may, by amplification appear at the output as a signal unrelated to the signal applied to the amplifying circuit. These temperature changes may occur not only because of drift in the ambient temperature but also as a result of heating effects of current flow in the circuit and particularly at the transistor junctions.

One object of this invention is to provide a means for minimizing the effect of ambient temperature variations on transistorized circuits.

Another object is the provision of a heat bank in which the transistorized circuit is mounted so that temperature variations in the circuit are minimized even though ambient temperatures outside the device in which the circuit is contained are of relatively large order, without affecting the operation of the circuit.

Another object is the provision of a device of the foregoing nature which minimizes production of an output signal from a transistorized circuit which is unrelated to the input signal, due to ambient temperature changes.

The aforementioned objects and advantages are accomplished according to the invention by mounting the transistorized circuit on a carrying structure which is positioned in a tube of high thermal conductivity such as a metallic tube. This assembly is incorporated in a container, preferably having heat reflecting walls, and said container is filled with an insulating material having a high heat mass, preferably paraffin wax, which surrounds said tube and the transistorized circuit therein. Electrical leads connect the transistorized circuit in said tube to the exterior of the container for connection, e.g., to a power source.

The assembly including said filled container, tube and transistorized circuit may be placed, although not necessarily, in an outer case having an electrical terminal on a wall thereof, and the electrical leads connected to the transistorized circuit pass through the paraffin wax or other material of high heat mass in said container and through an opening therein, and are connected to said electrical terminal. The outer case is employed primarily to protect said container and the circuit therein from physical damage due to rough handling or usage.

In this manner the transistorized circuit is locked or potted in the paraffin wax or other similar material described more fully below, which surrounds the circuit holding it in position and effectively insulating the circuit to minimize temperature variations in the circuit. The transistorized circuit is further insulated from ambient temperature variations by the heat reflective outer surfaces of the container. The tube surrounding the circuit in cooperation with the solid insulating material, e.g., paraffin, aids in evenly distributing heat along the length of the tube and thus maintaining equal temperature throughout the transistor circuit.

The invention will be more clearly understood by reference to the description below of certain illustrative embodiments of the invention taken in connection with the accompanying drawings, wherein.

Figure 1:
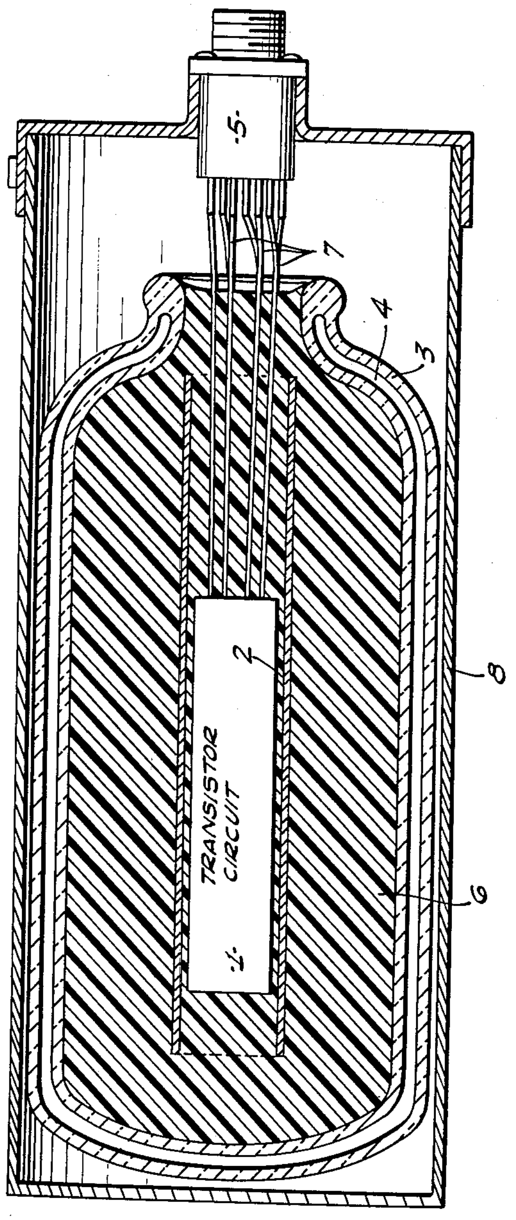
FIG. 1 is a sectional view shown partly in schematic form, of a heat bank device according to the invention.

Referring to FIG. 1, the transistor circuit is contained in a box or on a board or other carrying structure shown schematically at 1, and is placed inside a tube 2 of relatively high thermal conductivity, preferably composed of a metal such as aluminum. The tube and circuit are both placed in a container such as a double walled bottle 3. The space 4 between the bottle walls is evacuated and the surfaces inside and outside the bottle are silvered to give mirror surfaces. The conductors 7 are led through the neck of the bottle and are connected to a terminal connector 5. The bottle is filled with a solid material 6 of high heat mass.

By the term "material having a high heat mass," I mean materials having a high value for the product of specific heat times the specific gravity of the material. Materials of this nature may include organic and inorganic substances which can be handled readily for incorporation into the container having mounted therein the transistorized circuit.

I may use any suitable organic material, but I prefer to use paraffin wax since it has a high heat mass of about .61, and since it is free flowing at a relatively low temperature it may be melted and poured into the bottle and on coagulating will fill the bottle with a solid of high heat mass. Thermoplastic or thermosetting resins may be employed.

Thus, for example, I may employ the following thermoplastic resins; acrylate and methacrylate resins, cellulose acetate or cellulose butyrate-acetate resins, polyvinyl chloride, polyethylene, polystyrene or asphalt in place of paraffin wax. I may use a thermosetting phenol-formaldehyde or urea-formaldehyde resin or a copolymer ester resin employing a suitable catalyst to obtain polymerization. I may employ any of the conventional potting techniques for encasing of electrical circuits to establish the heat bank inside the vacuum bottle.

Also, I can use as material to be placed inside the container, a metal such as powdered iron, since it has a high heat mass of about .86 and can be readily poured into the container or bottle. However, the air spaces between the iron particles will reduce the heat mass value for this material. This can be alleviated by dispersing the powdered iron in a medium such as paraffin wax or a resin as described above to fill the interstices between the iron particles, said medium also having a high heat mass. This suspension in melted form can be poured into the bottle, and on cooling, the dispersed particles of iron are locked in the paraffin or other medium employed.

The entire assembly is placed in a box or case 8. The metallic tube acts to equalize the temperature along the length of the transistor circuit. The vacuum bottle and solid of high heat mass therein create a large heat barrier of low thermal conductivity and the large mass of said solid moderates the temperature variations resulting from any heat flow towards or away from the circuit.

If desired, I may omit the outer case 8, and in this event, a terminal connector such as 5 can be mounted in the neck of the bottle, although it is understood that such terminal connector is not necessary and the leads 7 may be passed simply through the neck of the bottle as seen in FIG. 1 for connection in an external circuit. The outer case 8 functions primarily to protect the bottle 3 from breakage, and such outer case may be constructed of any suitable material such as metal, plastic, and the like.

Figure 2:
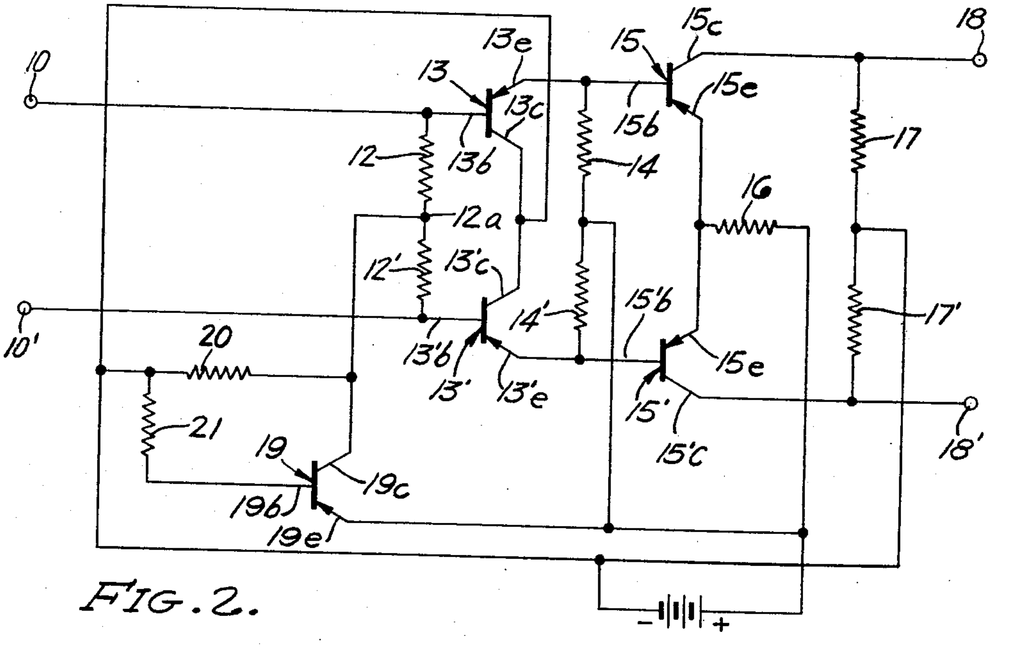
FIG. 2 is a wiring diagram of a differential direct coupled transistorized amplifier which can be incorporated in the heat bank of FIG. 1.

In the circuit of FIG. 2, the initial transistors 13 and 13' to whose bases 13*b* and 13'*b* the signal is applied at 10 and 10', are connected to the negative through two equal resistances 12 and 12'. Their emitter electrodes 13*e* and 13'*e* are connected to the bases 15*b* and 15'*b* of the following transistors 15 and 15'. The collector electrodes 15*c* and 15'*c* are connected to the output 18 and 18'.

The collector electrodes 13*c* and 13'*c* are connected to the negative pole of the battery. The emitter electrodes 13*e* and 13'*e* are connected through equal resistances 14 and 14' in a manner to be more fully described below. The collector electrodes 15*c* and 15'*c* are connected through equal load resistances 17 and 17' as will be more fully described below.

The transistors 13, 13' act to reduce the impedance of the input to these transistors 15 and 15'. Thus the high impedance of the input to these transistors 13 and 13' is reduced to a low impedance input to the voltage amplification transistors 15 and 15'.

Thus we have alternate stages of impedance reductions and voltage amplification stages in each leg of the differential amplifier. This is accomplished by reverse connection of the transistors 13, 13' with common collector electrode connection at the impedance reducing stages and common emitter electrode connection at the voltage amplification stage.

The voltage at the bases 13*b* and 13'*b* with respect to the positive of the battery is determined by current flow through the biasing resistances 12 and 12'. The voltage at the emitters 13*e* and 13'*e* will follow the voltage at the bases 13*b* and 13'*b* and be less as result of the resistance of the transistors. This establishes the voltage at the bases 15*b* and 15'*b* and constitutes the bias at the base 15*b* and 15'*b*. The emitters 15*e* and 15'*e* are in series with the resistance 16 and will be at substantially the voltage of the bases 15*b* and 15'*b*. The current flow through the transistor is that value which is necessary to establish the emitter voltage substantially equal to the base voltage. This current flow also occurs in the collector load resistances 17 and 17' and thus establishes the gain.

As shown in FIG. 2, the base bias resistors 12 and 12' of the first stage transistors 13 and 13' are connected to a transistor 19 which provides a voltage at the collector electrode 19*c* which is the negative of the thermally generated collector cut-off current of the transistors 13 and 13'. The collector electrode 19*c* is connected to the base 19*b* through resistances 20 and 21 to the negative. The emitter electrode 19*e* is connected to the positive.

Figure 3:
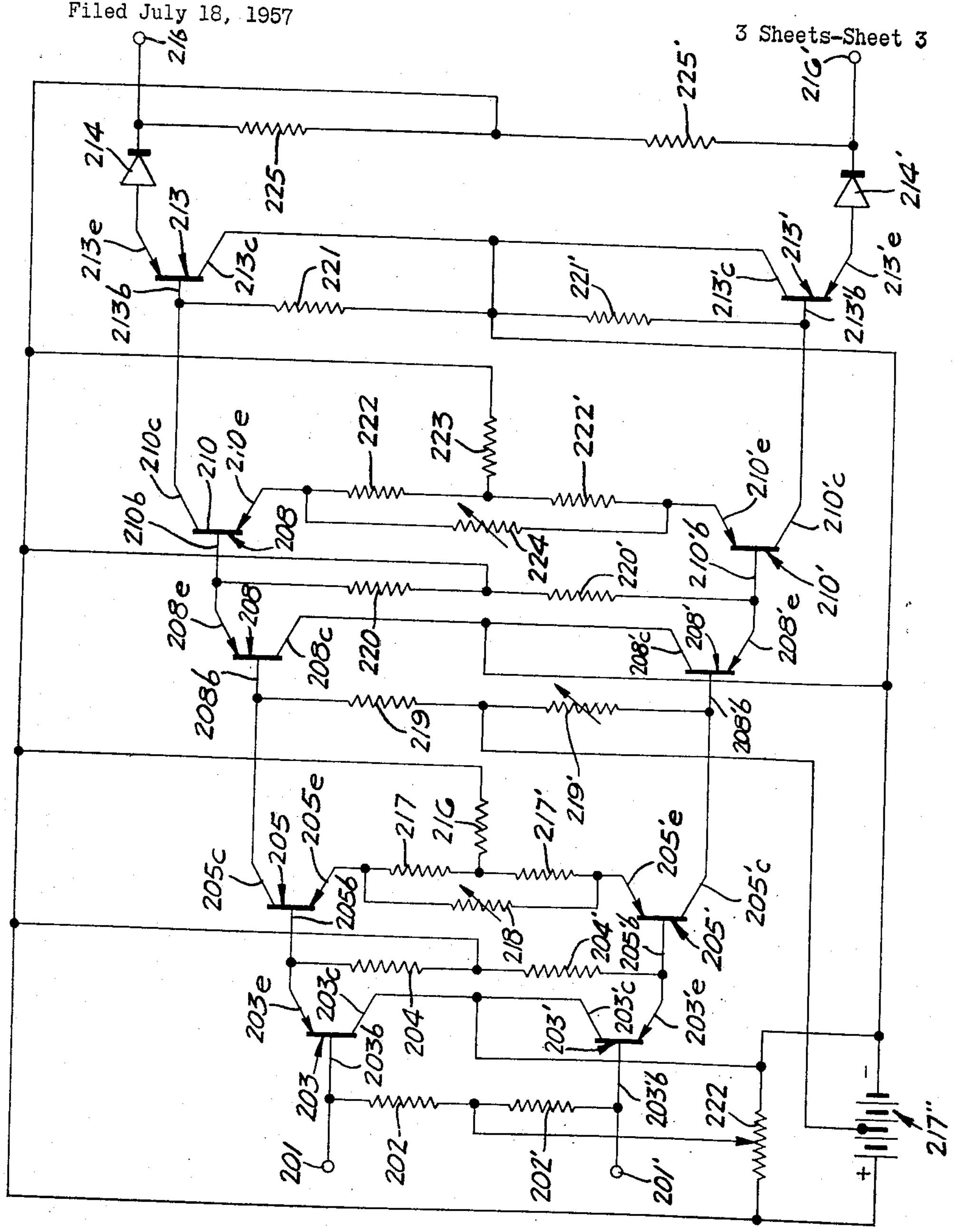
FIG. 3 is a circuit diagram of another transistorized amplifier which can be temperature stabilized by placement in the device of FIG. 1.

Instead of employing transistor 19 and resistances 20 and 21, to establish the bias at the bases 13*b* and 13'*b*, such bias may be established by a potentiometer connected across the terminals of the battery of FIG. 2 and connected to collector electrodes 13*c* and 13'*c* and to the resistances 12 and 12', as in the case of potentiometer 222 shown in FIG. 3.

FIG. 3 illustrates a differential amplifier employing multiple stages of amplification. As shown in FIG. 3, this circuit employs two parallel legs each leg being composed of a plurality of transistors arranged in cascade. The initial transistors 203 and 203' to whose bases 203*b* and 203'*b* the signal is applied at 201 and 201', are connected with their emitter electrodes 203*e* and 203'*e* connected to the base of the following transistors 205 and 205'. The collector electrodes 205*c* and 205'*c* are connected to the base 208*b* and 208'*b* of the succeeding transistors 208 and 208'. The system is repeated with the emitter electrode 208*e* of 208 and 208'*e* of 208' connected to the bases of 210 and 210' and the collector electrodes 210*c* and 210'*c* connected to the base of the transistors 213 and 213'.

The collector electrodes 203*c* and 203'*c*; 208*c* and 208'*c*; 213c and 213'*c* are each connected to the negative pole of battery or other equivalent direct current source. The bases 203*b* and 203'*b* are connected through equal resistances 202 and 202' through the potentiometer 222 to the battery 217''. The bases 205*b* and 205'*b* are connected through equal resistances 204 and 204' to positive terminal of the battery. The bases 208*b* and 208'*b* are connected by two resistances 219 and 219', one of which may be a variable resistance to an intermediate negative terminal of the battery at a negative potential lower than that to which the collector electrodes 208*c* and 208'*c* are connected. The bases 210*b* and 210'*b* and 213*b* and 213'*b* are likewise connected through resistances 220, 220', 221 and 221', respectively, and are connected, respectively, 220 and 220', to the positive and 221 and 221' to the negative terminal.

The emitter electrodes 205*e* and 205'*e* of the alternate transistor pair 205, 205'; and 210*e* and 210'*e* of the pair 210 and 210' are each connected through resistances 217 and 217' and 216, and 222, 222' and 223, respectively, to the positive pole. The pair of resistances are each shunted by a variable resistance 218 and 224, respectively.

The emitter electrodes 213*e* and 213'*e* are each connected to the output terminals 216 and 216' through a P-N diode 214 and 214' operating as Zener diodes.

The transistors 203, 203'; 208, 208'; 213 and 213' act to reduce the impedance of the input to the following transistors. Thus the high impedance of the input at 201 and 201' is reduced to a low impedance input to the voltage amplification transistors 205 and 205' and the higher impedance output of these transistors fed to transistors 208 and 208'. The lower impedance output from these transistors 208 and 208' are fed to the voltage amplification transistors 210 and 210' and the high impedance output from these transistors are fed to the following transistors 213 and 213' and the lower impedance output from 213*b* and 213'*b* fed through the Zener diodes to the output 216 and 216'.

Thus we have alternate stages of impedance reductions and voltage amplification stages in each leg of the differential direct coupled amplifier.

This difference in potential impressed across 201 and 201' is amplified by the gain of the amplification stages 205, 205', 210 and 210'. This differential gain is a function of the ratios of the impedance across the emitter electrodes to the impedance across the collector electrodes of the voltage amplification stages.

Variable resistance 219' adjusts the gain of the bottom amplifier leg to make it exactly equal to the upper leg and may be termed the differential balance control.

Resistances 218 and 224 adjust the differential gain of the amplifier by varying the differential mode degeneration.

The final stage 214 and 214' is a P-N diode (preferably a silicon diode). The purpose is to maintain the voltage at the output 216 and 216' with respect to the battery substantially the same as that at the input 201 and 201' with respect to the battery. The output of the diode is connected to 216 and 216' which are in turn connected by two equal resistances 225 and 225' to the positive terminal of the battery.

As will be understood by those skilled in the art from the description heretofore given in this specification, the potentiometer 222 may be replaced by the transistor 19, resistances 20 and 21 as in the case of FIG. 2.

The above circuits of FIGS. 2 and 3 are described and shown in my above co-pending application. These circuits are particularly designed to minimize change in output due to sensitivity of the transistors to thermal changes. As will be shown below, such variations in output due to ambient temperature changes and heating effects in the transistors are further markedly minimized by use of my heat bank.

Figure 4:
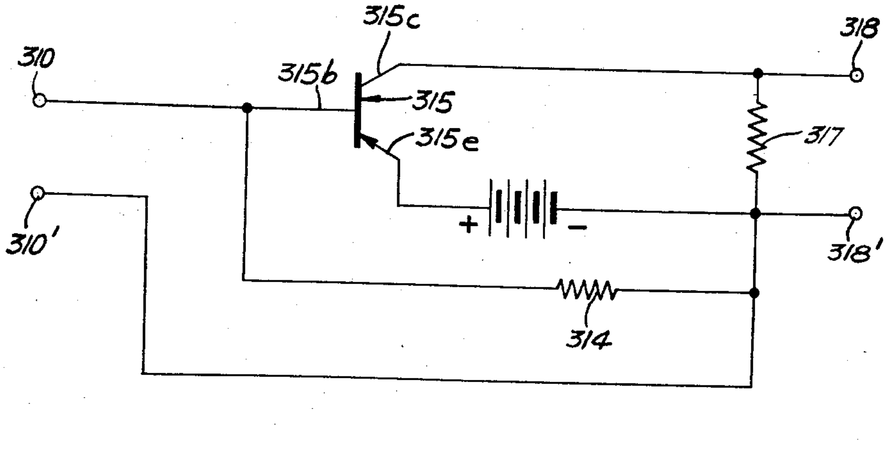
FIG. 4 is a circuit diagram of still another illustrative transistorized circuit which can be incorporated in the heat bank of FIG. 1 for temperature stabilization.

In FIG. 4 is shown a simple transistor amplifier circuit. Referring to FIG. 4, transistor 315 to whose base **315*b* the input signal is applied at 310 and 310', has its collector electrode 315*c* connected to one pole 318 of the output 318, 318', the emitter electrode 315*e* of the transistor being connected to the positive terminal of a battery, the negative terminal of which is connected to the other pole 318' of the output. A resistance 317 is connected across the output, and a resistance 314 is connected between the base electrode 315*b* of the transistor and the negative side of the battery. The pole 310' of the output is connected to the negative side of the battery in parallel with resistance 314**.

The following is given as an example to show the effectiveness of incorporating the transistor amplifier circuit of FIG. 3 in the heat bank device of the invention.

A differential D.C. amplifier connected as illustrated in FIG. 3 with the potentiometer 222 replaced by the transistor 19, resistances 20 and 21 as illustrated in FIG. 2, and having also the low impedance tap connection illustrated in FIG. 3, was adjusted to establish −3 volts, with respect to the positive terminal of the battery, at **203*b* and 203'*b*. The emitter 213*e* and 213'*e* were at 10.4 volts and the terminals 216 and 216' each at −3 volts with respect to the positive of the battery. With no differential signal impressed across 201 and 201', the system showed, under normal laboratory conditions over a period of one hour, a variation at the terminals 216 and 216'** of ± 100 microvolts. An approach of a human body caused the device to drift 300 microvolts. This, it is believed, was due to the practical inability to match the temperature of resistors and transistors during all changes of temperatures. Thus, because of this inequality in the thermal characteristics of the two legs some common mode signal survived and appeared at the terminals.

The above circuit of FIG. 3 was placed in the vacuum bottle shown in FIG. 1, omitting the case 8, and the bottle was filled with paraffin wax and subjected to the same environmental conditions as noted immediately above, and for the above environmental temperature conditions, the potential difference at the terminals, with no differential signal at the input was but ± 3 microvolts. That is, the total drift was but 3 microvolts. This was not substantially changed by placing a hot soldering iron adjacent the outer wall of the vacuum bottle.

The heat bank of FIG. 1 was also tested for effectiveness in minimizing variations and drift of output of the transistor circuit of FIG. 4, due to embient temperature changes and heating effects within the transistor. The battery employed in the circuit of FIG. 4 was a six volt battery, resistance 317 was 5000 ohms, and resistance 314 was 500,000 ohms. The gain of the amplifier was approximately 100.

With no signal impressed on the input 310, 310', the system showed, under normal laboratory conditions over a period of one hour, a random drift or variation in output at the terminals 318, 318' indicated by a continuous graph taken on a chart traveling at a speed of one foot per hour. The output values taken from said graph at 5 minute intervals are listed in the table below.

*Table 1*

| Time (minutes): | Output (millivolts) |
|---|---|
| 0 | 39 |
| 5 | 36 |
| 10 | 44 |
| 15 | 47 |
| 20 | 46 |
| 25 | 45 |
| 30 | 46 |
| 35 | 52 |
| 40 | 64 |
| 45 | 52 |
| 50 | 53 |
| 55 | 54 |
| 60 | 68 |

The curve of the output was a highly irregular line showing a random motion as indicated by the values in FIG. 1, the output varying in random fashion from about 36 to about 68 millivolts due to temperature variations.

The circuit of FIG. 4 was then mounted on the carriage 1 within a thermos bottle filled with paraffin as shown in FIG. 1, but omitting the outer case 8 shown in FIG. 1, and tested in the same manner and under the same environmental conditions as noted above for this same circuit without the bottle. Table 2 below gives the results when no signal was impressed on the input terminals.

*Table 2*

| Time (minutes): | Output (millivolts) |
|---|---|
| 0 | 40 |
| 5 | 40 |
| 10 | 40 |
| 15 | 40 |
| 20 | 41 |
| 25 | 42 |
| 30 | 43 |
| 35 | 44 |
| 40 | 45 |
| 45 | 46 |
| 50 | 46.5 |
| 55 | 47 |
| 60 | 47 |

The curve of the output from the circuit of FIG. 4, when said circuit was placed in the heat bank of FIG. 1, as indicated in Table 2, above, was a straight slightly sloping line with no random motion as in the case of the same circuit not placed in the heat bank. As seen from Table 2, output increased very gradually from 40 millivolts at the start to only 47 millivolts at the end of an hour, a total gradual drift of only about 7 millivolts, as compared to a random variation of about 32 millivolts in the case of the same circuit not incorporated in the heat bank, as shown in Table 1.

From the foregoing, it is seen that I have designed a heat bank device, which greatly reduces or minimizes variation or drift of output due to ambient temperature variations and heating effects of current flow in transistorized circuits when the latter are incorporated in my device.

As will be understood by those skilled in this art, from the description herein given, the transistors, as illustrated in the figures and described in the specification, may be replaced by transistors of opposite polarity. Thus, where in the diagrams the transistors employed are P-N-P transistors, I may employ instead N-P-N transistors making the corresponding changes in the polarity of the electrodes as will be clear to those skilled in this art.

As is well known the symbols N and P stand for negative and positive elements of the junction transistors and are common symbols used in this art for designation of transistors.

While I have described a particular embodiment of my invention for the purpose of illustration, it should be understood that various modifications and adaptations thereof may be made within the spirit of the invention as set forth in the appended claims.

I claim:

1. In combination, a heat bank for a transistorized circuit which comprises a container having vacuum insulated heat reflecting walls, a metallic tube in said container spaced from the walls thereof, means in said tube for mounting a transistorized circuit, a transistorized circuit carried on said mounting means, an insulating solid composed of organic material in said container, said solid having a high heat mass, and electrical wire means connecting said circuit and extending to the outer periphery of said container, said solid completely surrounding said mounting means and said circuit, and said tube, and completely filling said container.

2. A heat bank for a transistorized circuit which comprises a bottle having mirrored heat reflecting walls, said bottle having a double wall and being evacuated in the space between said double wall, a metallic tube positioned axially in said bottle and spaced from the walls thereof, said tube having a high thermal conductivity, a mounting member in said tube for mounting a transistorized circuit, a transistorized circuit mounted on said mounting member, an insulating solid composed of organic material in said bottle, said solid having a high heat mass, and electrical wire means extending from said mounting member through the neck of said bottle, said solid completely surrounding said mounting means and said circuit, and said tube, and completely filling said bottle.

3. A heat bank for a transistorized circuit which comprises a container having a vacuum insulated wall, a tube of high thermal conductivity in said container spaced from the walls thereof, means in said tube for mounting a transistorized circuit, a transistorized circuit carried on said mounting means, an insulating solid in said container, said solid completely surrounding said circuit and said tube, and potting said transistor circuit within said tube, said solid being composed of a material having a high heat mass, and electrical wire means extending from said circuit to the outer periphery of said container, said solid completely filling said container.

4. A heat bank as defined in claim 3, wherein said solid is paraffin wax.

5. In combination, a heat bank for a transistorized circuit which comprises a case, a double walled bottle in said case, the space between said double wall being evacuated, the outer and inner walls of said bottle being silvered and forming mirror surfaces, a metallic tube positioned axially in said bottle and spaced from the walls thereof, said tube having a high thermal conductivity, a circuit mounting member in said tube, a transistorized circuit mounted on said mounting member, an insulating solid composed of organic material in said bottle and said tube and completely surrounding said mounting member and circuit thereon, and completely filling said bottle, said solid having a high heat mass, an electrical terminal mounted on the wall of said case, and electrical wires connecting said circuit and said terminal, said wires passing through said solid and the neck of said bottle.

References Cited in the file of this patent

UNITED STATES PATENTS

| | | |
|---|---|---|
| 1,421,325 | Walker et al. | June 27, 1922 |
| 1,882,989 | Schumacher | Oct. 18, 1932 |
| 1,884,797 | Meyer | Oct. 25, 1932 |
| 2,103,078 | Holst et al. | Dec. 21, 1937 |
| 2,404,445 | Kuenstler | July 23, 1946 |
| 2,546,321 | Ruggles | Mar. 27, 1951 |
| 2,547,607 | Sulfrian | Apr. 3, 1951 |
| 2,704,431 | Steele | Mar. 22, 1955 |
| 2,785,322 | Wood | Mar. 12, 1957 |
| 2,791,706 | Font | May 7, 1957 |
| 2,858,407 | Hykes | Oct. 28, 1958 |
| 2,906,931 | Armstrong | Sept. 29, 1959 |

FOREIGN PATENTS

| | | |
|---|---|---|
| 958,140 | Germany | Feb. 14, 1957 |

OTHER REFERENCES

Electronics, vol. 28, No. 5, May 1955, "Embedding Technique For Three-Tube Plug-In Unit," by Roy C. Fox, pages 250–264.

Electronic Design, May 1955, "Encapsulated Plug-In Circuits," pages 32–33.